Patented July 26, 1932

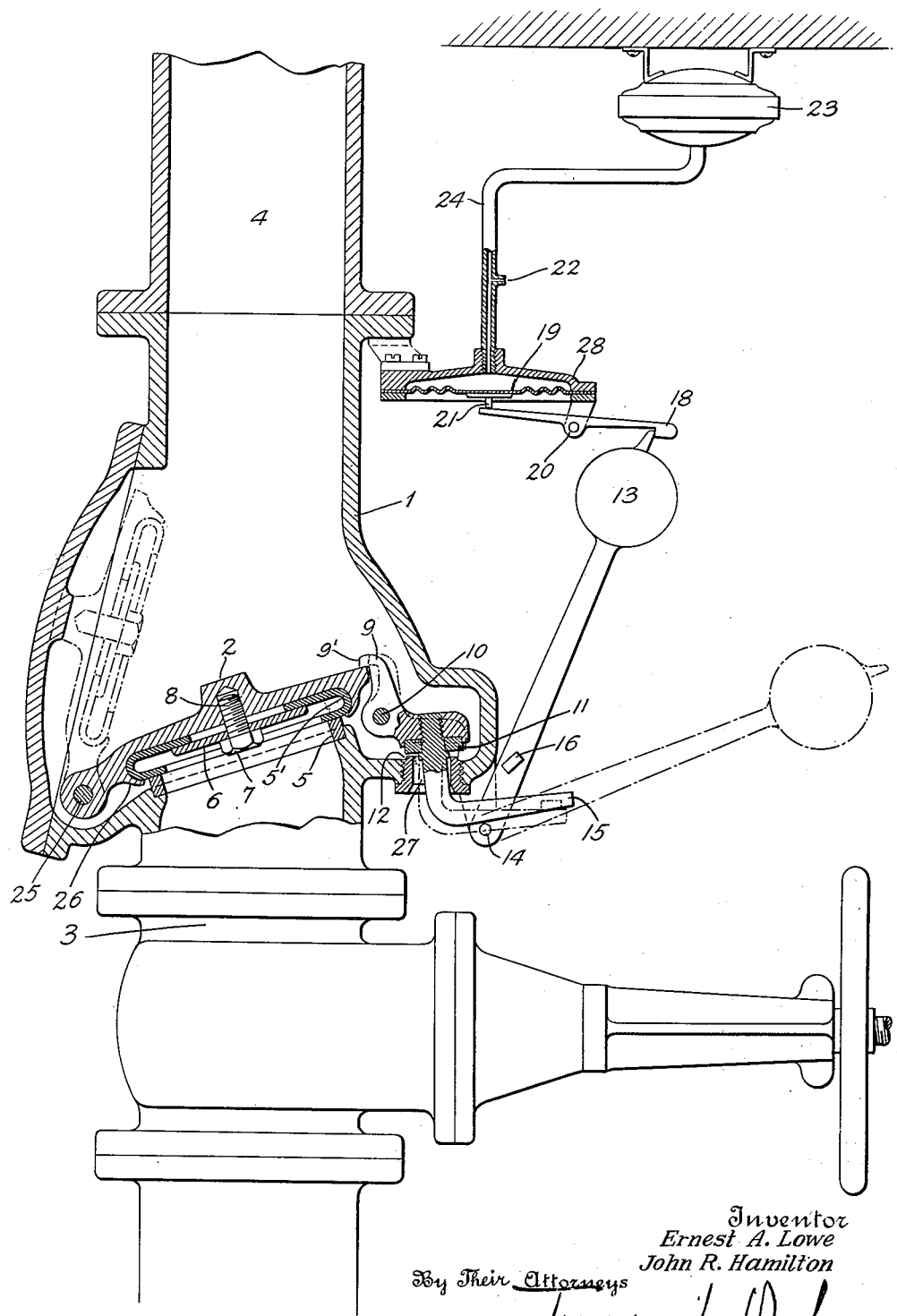

1,869,204

UNITED STATES PATENT OFFICE

ERNEST A. LOWE AND JOHN R. HAMILTON, OF CLEVELAND HEIGHTS, OHIO, ASSIGNORS TO AUTOMATIC SPRINKLER COMPANY OF AMERICA, OF CLEVELAND, OHIO, A CORPORATION OF DELAWARE

DELUGE VALVE

Application filed December 29, 1927. Serial No. 243,276.

The present invention relates to fire extinguishing apparatus or devices wherein a valve normally shutting off the flow of the fire extinguishing medium is held closed against an influence tending to open the same, such for instance as the medium under pressure, by a mechanical locking device or catch that is automatically operated by thermostatic action or is otherwise operated to cause the valve to open.

The invention is especially useful in connection with a control valve interposed between the source of supply, as for instance a main holding water or other medium under head or pressure, and the piping or passageway through which the medium is delivered to an outlet through which it escapes to extinguish the fire.

The invention further is specially useful in connection with a system in which the piping on the outlet side of the said valve is normally dry and in which also, by preference, no provision is made for maintaining a pressure therein different from normal atmospheric pressure.

The invention provides a simple and compact construction wherein the valve may be mechanically released by a releasing member extending through a wall of the valve or piping on the exit or outlet side of the valve and at the same time avoiding the escape of the released liquid or fluid from the opening through which said release member passes for actuation.

The invention consists in providing said releasing arm or lever with a valve which will become seated against a valve seat around the opening through which the arm passes and close the same against escape of fluid when said lever is actuated to release the main control valve and also on constructing said release lever with an arm or extension adapted to be engaged by a weighted striker to actuate the same.

The invention also insures the sealing of the main valve by provision of means which will prevent the escape of the fluid between the valve seat and the face of the valve. This means consists essentially of a valve facing of flexible material secured against the face of said valve but having a free edge inturned and adapted to engage the valve seat and held against the same by the internal pressure independent of any pressure or mechanism holding the valve itself against movement.

The invention further consists in details of construction and combinations of devices whereby the objects of our invention are attained as will be hereinafter more particularly described and then specified in the claims.

In the accompanying drawing we show in vertical section one of the forms of apparatus in which our invention may be embodied.

At 2 is indicated a form of control valve which for quick action is usually in the form of a flap valve suitably pivoted, as for instance at 25, and serving to retain a head of water or other medium in the supply pipe 3 against passing therefrom to the piping 4 leading to suitable fire extinguishing outlet or outlets. Said flap valve so pivoted and arranged will, in the normal operation, assume the position indicated in dotted lines so as to leave a free passageway from 3 to 4 for the water or other medium. The piping or passageway 4 is preferably dry and, by preference, no special means are employed to maintain any air pressure therein although it would not be inconsistent, with the employment of the devices herein described, to employ some air pressure provided it were not sufficient to prevent the opening of the flap valve 2 under the retained normal pressure of fluid in the supply pipe 3.

The water clapper or valve 2 is retained against the valve seat or seat ring 5 by a mechanical lock consisting preferably of a dog or catch 9' locking on the upper or outlet side of the valve and carried by a suitable release member comprising a lever 9 pivoted for instance as indicated at 10 within the chamber on the outlet side of the flap valve or pivoted at any other desired point. Said release arm or lever 9 extends through an opening 27 made in a wall of the chamber or passageway on the outlet side of the valve and of sufficient size to allow free movement of the lever in the operation of freeing the catch or latch 9' to permit the control valve to open under the retained pressure in 3 or by other influence. Said lever 9 is provided on the exterior of the apparatus with an arm 15 by which it may be operated through engagement of a thermostatically controlled weighted striker or by other means. As will be seen the opening 27 not only serves the purpose of allowing freedom of movement or actuation of the lever 9 from the outside but it also may serve as a drip opening for leakage of water or other fluid past the control valve.

In order to prevent the escape of the fluid through the opening 27 when the control valve is opened by the use of the release member 9 we provide suitable means for closing said opening or passageway 27 when the release member assumes the position necessary for freeing said control valve. For this purpose we may provide the lever, as indicated at 11, with a suitable valve facing which engages and seats against the seat 12 around opening 27 to thereby seal said opening as soon as the control valve is released and opens.

The release of the control valve by operation of the member 9 is effected by a suitable weighted striker.

At 13 is indicated a weighted arm normally held in the position shown by a release lever having a catch or detent 18, said weighted lever being provided with a projection 16 which will strike against the arm 15 when the weight falls and turn the release member 9 so as to free the control valve. The actuation of release lever 18 for this purpose may be effected by the operation of a thermostat preferably of the rate of rise type and comprising an air chamber 23 connected by tube or piping 24 with a diaphragm case 28 normally sealed by a diaphragm 19, said diaphragm being provided with a pin or projection 21 adapted to engage and operate the catch lever 18, pivoted at 20, to free the weighted lever 13 when the pressure in the diaphragm chamber increases to the predetermined point.

In association with the air thermostat and its connections is the vent 22 of restricted size. In operation, when the air in 23 expands by change of temperature, the pressure is conveyed through pipe 24 to the diaphragm chamber but when the increase of pressure produced by the heat is at less than a given rate or predetermined rate, the pressure will equalize to the atmosphere through the vent 22 which is of regulated size for that purpose. Thus normal changes of heat of the premises due to normal conditions are allowed to equalize by vent 22 and no excess pressure is built up in the system. But should the increase of temperature be rapid, such for instance as from a fire, the rate of increase of pressure is greater than can be equalized through vent 22 and this pressure travels on to diaphragm case 28 where it expands diaphragm 19, forcing it downward, thus pushing pin 21 against the end of release lever 18, forcing the one end downward and the opposite end upward to a point where it no longer restrains weighted arm 13 but allows same to fall into the position shown by dotted lines.

The main or control valve 2, as shown, is provided with a valve facing 5' of rubber, leather or any other suitable composition or material flexible in nature, which is clamped to the under side of the valve or clapper by retaining plate 6 held in place by a suitable bolt 7. The outer edge of the flexible valve facing is inturned and seats upon the valve seat ring 5, as shown. As will be seen, the pressure of the water or other medium below the valve acts on the inner side of the flexible, inturned edge of the facing 5' to force it against the seat ring 5 and thus avoids, as far as possible, leakage past the control valve while the latter is mechanically held down by the mechanical locking devices already described. A suitably formed retaining flange 26 is provided to retain the flexible valve facing 5' in position and prevent it from spreading, thereby retaining it in position where it may flexibly contact with the seat 5 to prevent escape of water or other fluid when the valve is in normal seated position. Any water that might leak by, however, can escape from the valve casing through opening 27 that serves the double purpose of allowing the escape of any such leakage which otherwise might accumulate in the body of the valve, or extend upward in pipe 4 which to those familiar with this type of valve, will be seen to have disadvantages. Opening 27 also serves the purpose of allowing the operating arm 15 of latch 9 to pass through the wall of the valve so that it may be operated on by the striker as already described.

The action of the apparatus is as follows:

Normally the control valve is seated as shown and retained in seated position by the latch or catch 9' or other mechanism. The flexible facing 5' in addition to providing the improved seal, also will compensate for any inequalities in the engaging surfaces of the locking or detaining mechanism which engages and holds the flap valve down. The weighted lever 13 is in lifted position and the operating or release lever or member 9 will be retained in the position shown by the engagement of the flap valve with the catch 9' operating as a trigger and free to release the flap valve upon the application of force applied to the operating arm 15. If desired a light spring may be used to assist in holding the release member and catch in the normal position shown in full lines. When the weighted arm falls projection 16 thereon impinges upon the upper surface of operating arm 15, rotating the same on point 10 and disengaging the projection 9' from the toe of clapper 2, thus releasing the water previously held in restraint in pipe 3 and allowing it to pass on to any system to which it may be connected by pipe 4. The downward motion of releasing arm 15 forces valve facing 11 against seat 12, where it is held by the weighted striker thus forming a more or less watertight joint and preventing the escape of the released fluid through drain hole 27, which as above described has taken care of any slight leaks during the period in which the valve was in the normal or set position.

What we claim as our invention is:

1. In a fire extinguishing apparatus, the combination with a valve disk normally holding back the water or other fire extinguishing medium under pressure, of a valve facing of flexible material having an inturned edge adapted to engage the valve seat and providing a space within which the retained pressure of the medium may hold it against the valve seat independently of the position of the valve itself.

2. In a fire extinguishing apparatus, the combination with a valve disk of a valve facing having a flexible inturned edge adapted to engage the valve seat and a retaining flange for retaining said flexible edge in position.

3. In a fire extinguishing apparatus, the combination of a control valve normally tending to unseat itself by pressure of the fire extinguishing medium, a catch engaging directly with and holding the same seated, a member extending through an opening in the casing and having said catch mounted directly on it, said member carrying also means for sealing said opening in its catch releasing position, a weighted lever normally sustained above said member and adapted to strike the same directly, a catch normally sustaining said lever and a diaphragm carrying said catch and subject to change of air pressure in a piping terminating in the diaphragm chamber and adapted to operate the catch upon change of such pressure.

4. In a fire extinguishing apparatus, the combination with a disk valve and mechanical locking means engaging and holding said valve in normal closed position, said valve being provided with a valve facing of flexible material having a reentering inturned edge free to flexibly engage the valve seat and providing a water receiving space in which the water pressure acts to hold said flexible reentering edge firmly engaged with said seat.

Signed at Cleveland in the county of Cuyahoga and State of Ohio this 23rd day of December, A. D. 1927.

ERNEST A. LOWE.
JOHN R. HAMILTON.